METHOD AND SYSTEM FOR TRANSMITTING DATA

Filed Feb. 18, 1958 6 Sheets-Sheet 1

INVENTOR.
EMIL HOPNER
HAROLD G. MARKEY
BY
Richard E. Cummins
ATTORNEY

April 11, 1961 E. HOPNER ET AL 2,979,566

METHOD AND SYSTEM FOR TRANSMITTING DATA

Filed Feb. 18, 1958 6 Sheets-Sheet 2

METHOD AND SYSTEM FOR TRANSMITTING DATA

METHOD AND SYSTEM FOR TRANSMITTING DATA

Filed Feb. 18, 1958 6 Sheets-Sheet 4

April 11, 1961 E. HOPNER ET AL 2,979,566

METHOD AND SYSTEM FOR TRANSMITTING DATA

Filed Feb. 18, 1958 6 Sheets-Sheet 5

United States Patent Office 2,979,566

Patented Apr. 11, 1961

2,979,566

METHOD AND SYSTEM FOR TRANSMITTING DATA

Emil Hopner and Harold G. Markey, San Jose, Calif., assignors to International Business Machines Corporation, New York, N.Y., a corporation of New York Filed Feb. 18, 1958, Ser. No. 715,976

9 Claims. (Cl. 178—67)

This invention relates in general to data transmission and in particular to an improved method and system for transmitting and receiving a phase modulated informational signal.

In transmitting data between remote points through presently available telephone networks, the prior art has shown that errors in data transmission arising from impulse noise in the system are greatly reduced if the information is transmitted by means of a bit synchronous, phase modulated signal. In such systems the "yes" and "no" portion of the information is transmitted in the form of 180° phase reversals of the subcarrier. Hence, in order to cause an error the disturbance has to be greater than the signal and 180° out of phase with the bit information. Similarly, a signal level change affects only the magnitude of the information carrier and not the information carrying polarity.

The generation of a subcarrier signal, phase modulated in accordance with information being transmitted, is a relatively simple problem. However, detection of such a signal after it has been transmitted through a single sideband suppressed carrier telephone network creates somewhat of a problem since the original reference signal, i.e., the subcarrier, is lost in this type of transmission. The problem is further complicated by the fact that many telephone networks cause the frequency spectrum of the transmitted signal to shift since the oscillators employed for modulation and demodulation of the telephone carrier are at two different locations and may not operate continuously at the same frequency. Hence, the phase modulated subcarrier presented to the detector unit of the receiver is continuously changing with respect to the signal as generated. The phase of the received information, therefore, changes continuously at the rate of the frequency spectrum shift.

The known prior art has suggested a solution to the problem which involves comparing the phase relationship of consecutive bits, each of which contains many cycles of the subcarrier. Such an arrangement is satisfactory when the bit rate is considerably smaller than the frequency of the subcarrier since it is therefore possible to employ many cycles of the subcarrier as a reference signal, and if only one cycle of the carrier is affected by impulse noise, the chances of an error are still relatively small. However, as the bit rate approaches the frequency of the subcarrier, less and less cycles of the subcarrier are contained as a reference signal and the possibility of obtaining an error is increased since an impulse disturbance of the magnitude of a single cycle of the subcarrier appears first as a bit error and secondly as a reference error for the following bit. As a result, under some conditions errors resulting from impulse noise may be doubled instead of being decreased.

The present invention eliminates this problem and, in addition, provides an economical high speed data transmission system. In accordance with the present invention data may be transmitted between remote points through a communication channel which shifts the original spectrum, as in the case of a single sideband suppressed carrier telephone network, by transmitting from the transmitter a pilot signal simultaneously with a phase modulated subcarrier, and at the receiver regenerating a subcarrier signal from the shifted phase modulated subcarrier to provide a subcarrier reference signal for demodulating the shifted phase modulated subcarrier to provide an informational signal and simultaneously generating at the receiver a clock signal from the shifted subcarrier and the shifted pilot signal to control the bit sampling time of the informational signal.

It is therefore an object of the present invention to provide an improved method and apparatus for transmitting data between remote points over a communication channel which may have a frequency spectrum shift.

Another object of the present invention is to provide an improved method and system for transmitting and receiving information through a communication channel employing single sideband suppressed carrier modulation.

A further object of the present invention is to provide an improved method and system for transmitting data through present-day commercial telephone networks.

A still further object of the present invention is to provide an improved method and system for detecting information in a phase modulated subcarrier data transmission system.

Other objects of the present invention will be pointed out in the following description and claims and illustrated in the accompanying drawings which disclose, by way of example, the principle of the invention and the best mode which has been contemplated of applying that principle.

Figure 2:
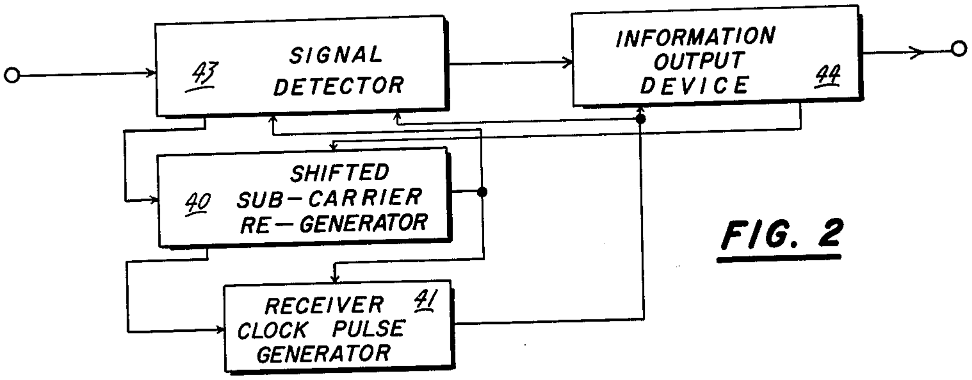
Fig. 2 is a block diagram illustrating the receiver employed in the present invention.
Figure 7A:
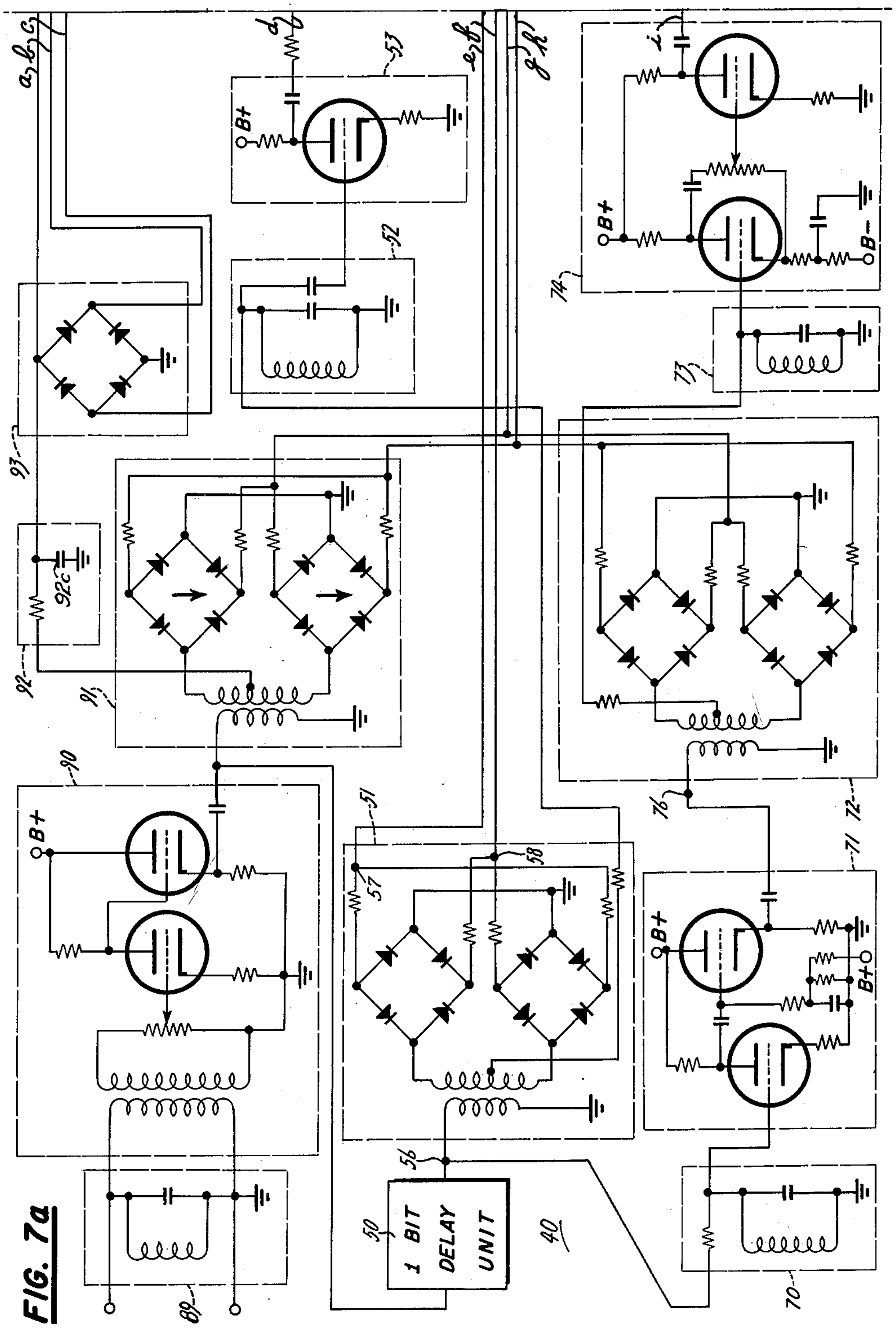
Figure 7B:
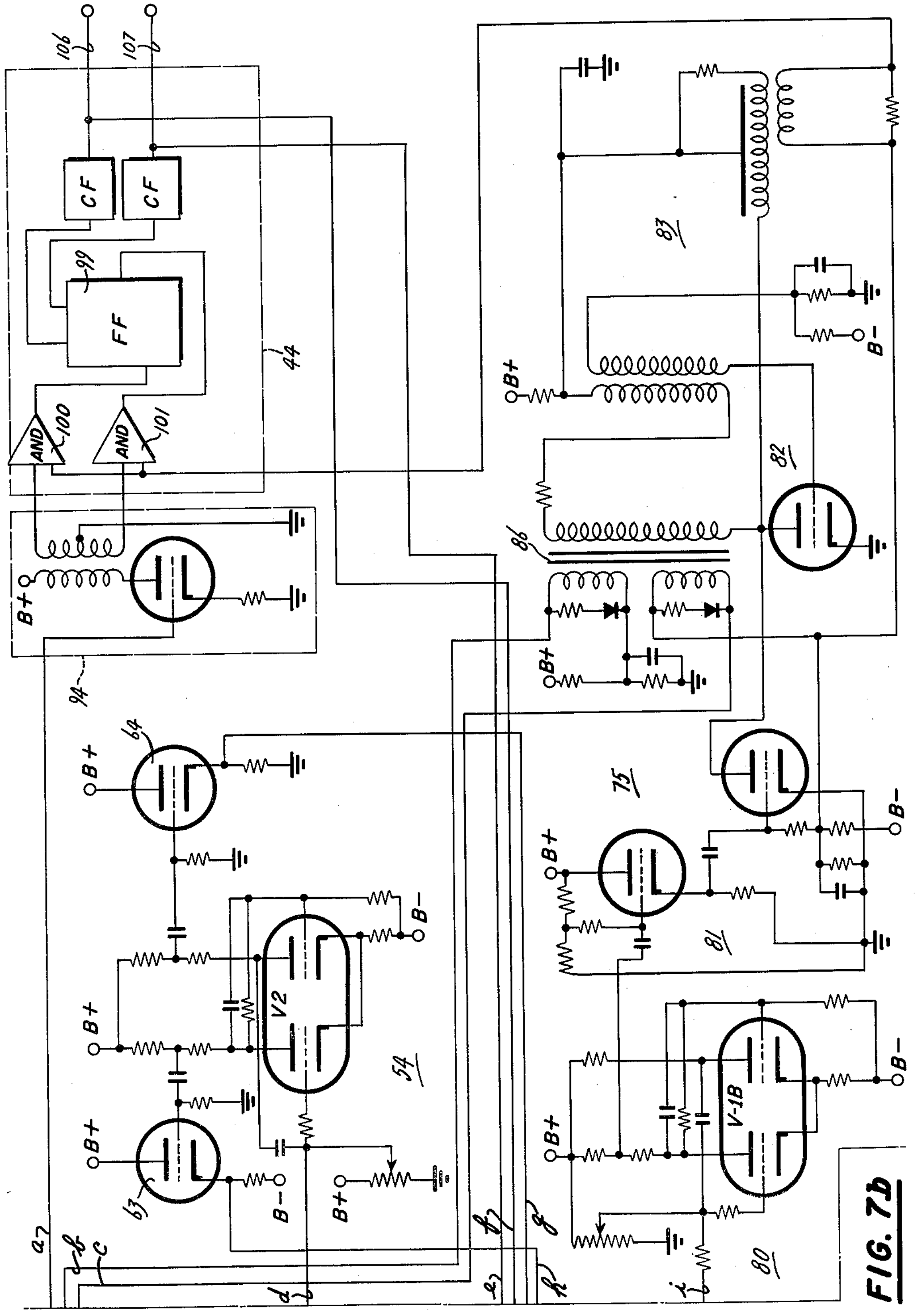

Figs. 7*a* and 7*b* together illustrate schematically the receiver shown in block form in Fig. 2.

Figure 8:
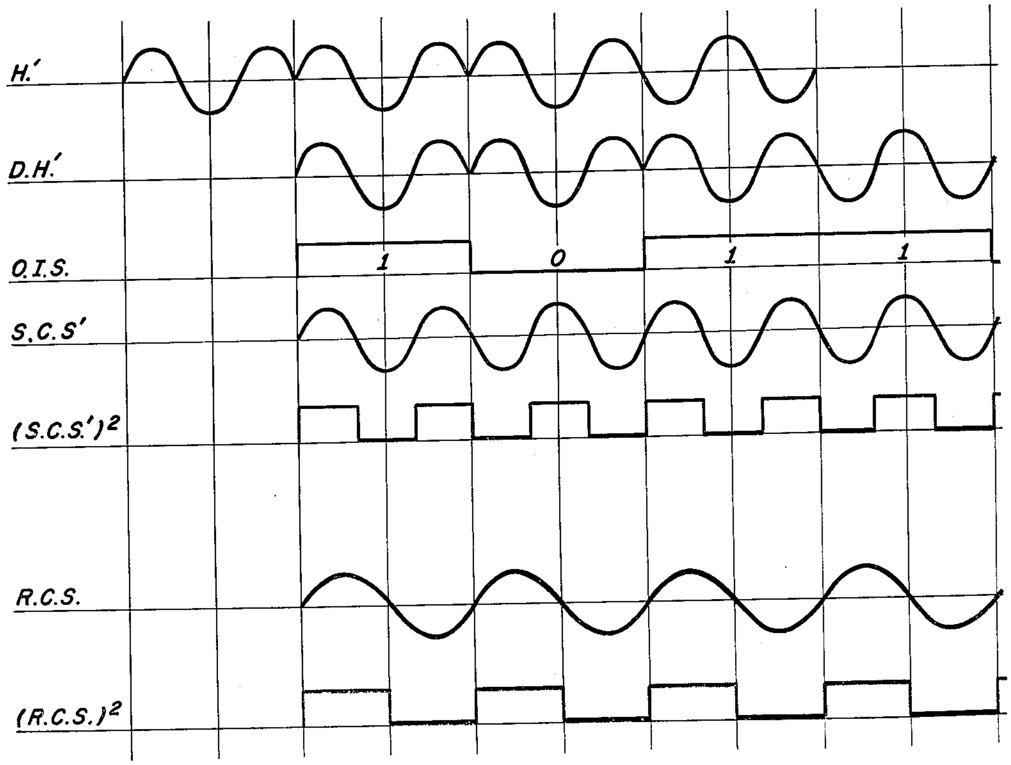

Fig. 8 is a graph illustrating voltage waveforms generated by the shifted subcarrier regenerator means and clock signal generating means of the data receiver.

Figure 9:
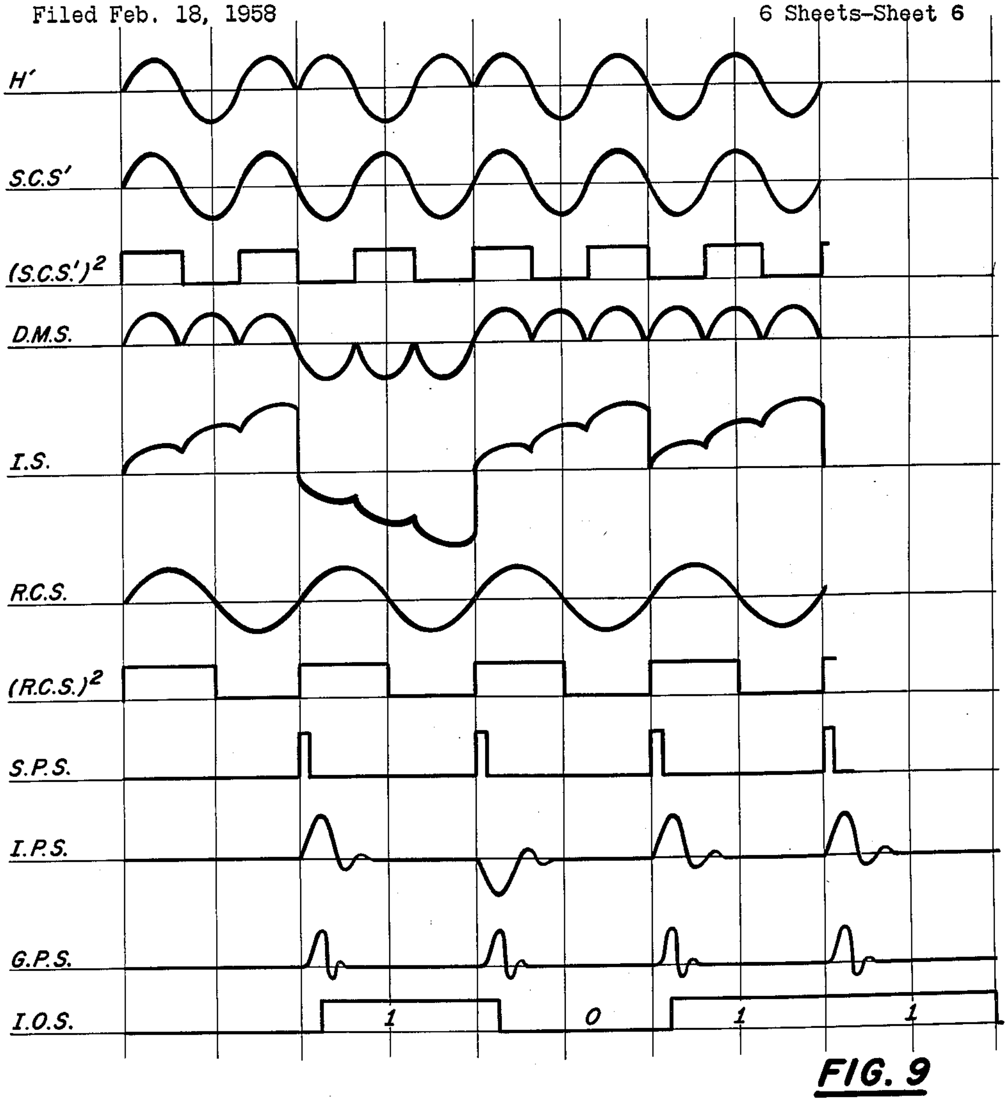

Fig. 9 is a graph illustrating voltage waveforms generated by the signal detecting means and information output unit shown in Fig. 2.

Figure 1:
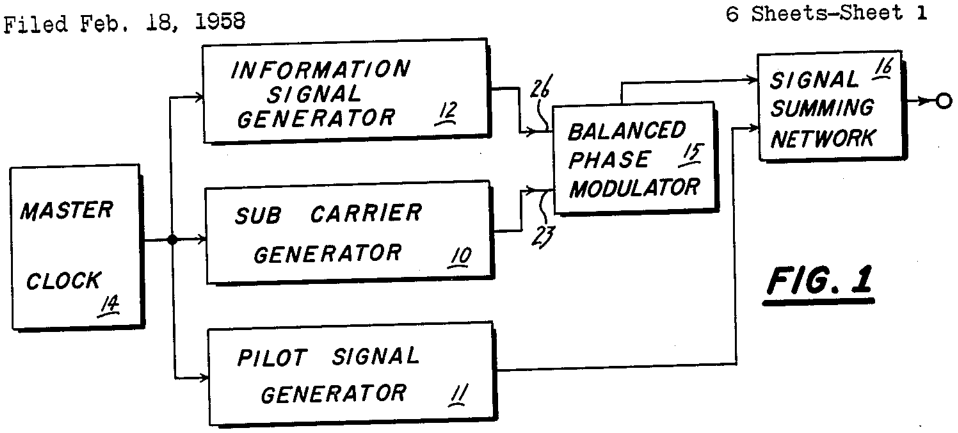
Fig. 1 is a block diagram illustrating the transmitter employed in the present invention.
Figure 10:
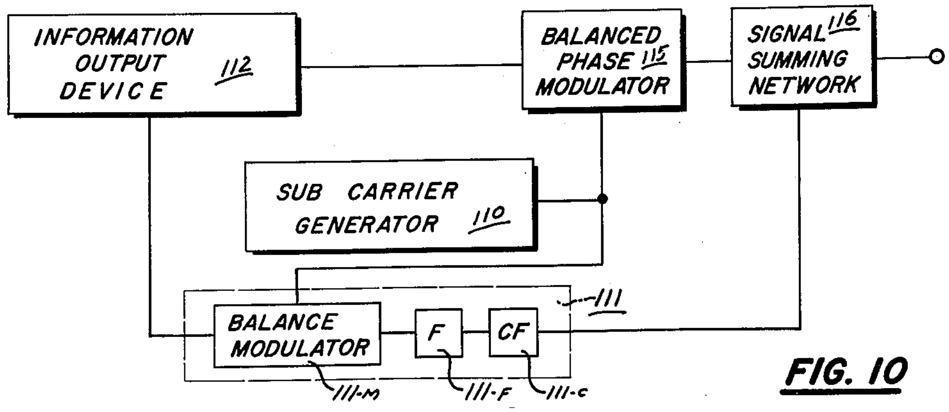

Fig. 10 is a diagrammatic view illustrating a modification of the transmitter shown in Fig. 1.

Figure 3:
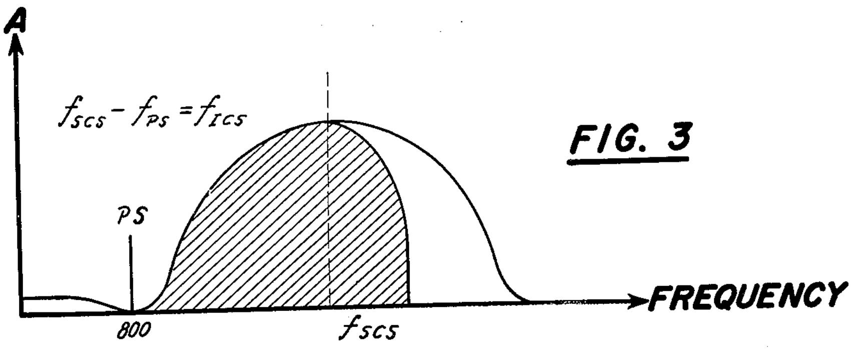
Figs. 3 and 4 are diagrams illustrating the frequency spectrum and spectrum shift, respectively, for a typical communication channel employed with the present invention.
Figure 4:
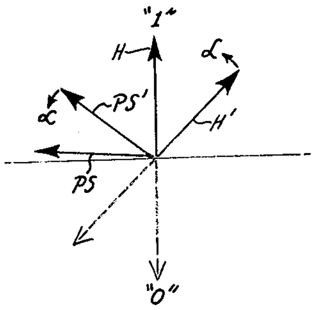

Referring to the drawings and particularly to Figs. 1 through 4, the improved data transmission system comprises generally a data transmitter, shown diagrammatically in block form in Fig. 1, connected to a data receiver, shown diagrammatically in block form in Fig. 2, by means of a single sideband suppressed carrier communication channel which shifts the original frequency spectrum of the transmitter shown in Fig. 3 by $\alpha$ c.p.s. as shown vectorally in Fig. 4.

The data transmitter shown in Fig. 1 functions to transmit a bit synchronous subcarrier signal, phase modulated in accordance with coded data obtained from a suitable information read-out device, and simultaneously therewith a pilot signal having a predetermined frequency and in synchronism with the phase modulated subcarrier signal.

The transmitter as shown in Fig. 1 comprises generally means 10 for generating a subcarrier signal, means 11 for generating a pilot signal, means 12 for generating an information signal corresponding to the data being sent, means 14 for synchronizing the signals, means 15 for modulating the subcarrier signal with the informational signal to provide a bit synchronous phase modulated subcarrier signal, and signal summing means 16 for supplying the phase modulated subcarrier and the pilot signal simultaneously to the input side of the communication channel (not shown).

Figure 5:
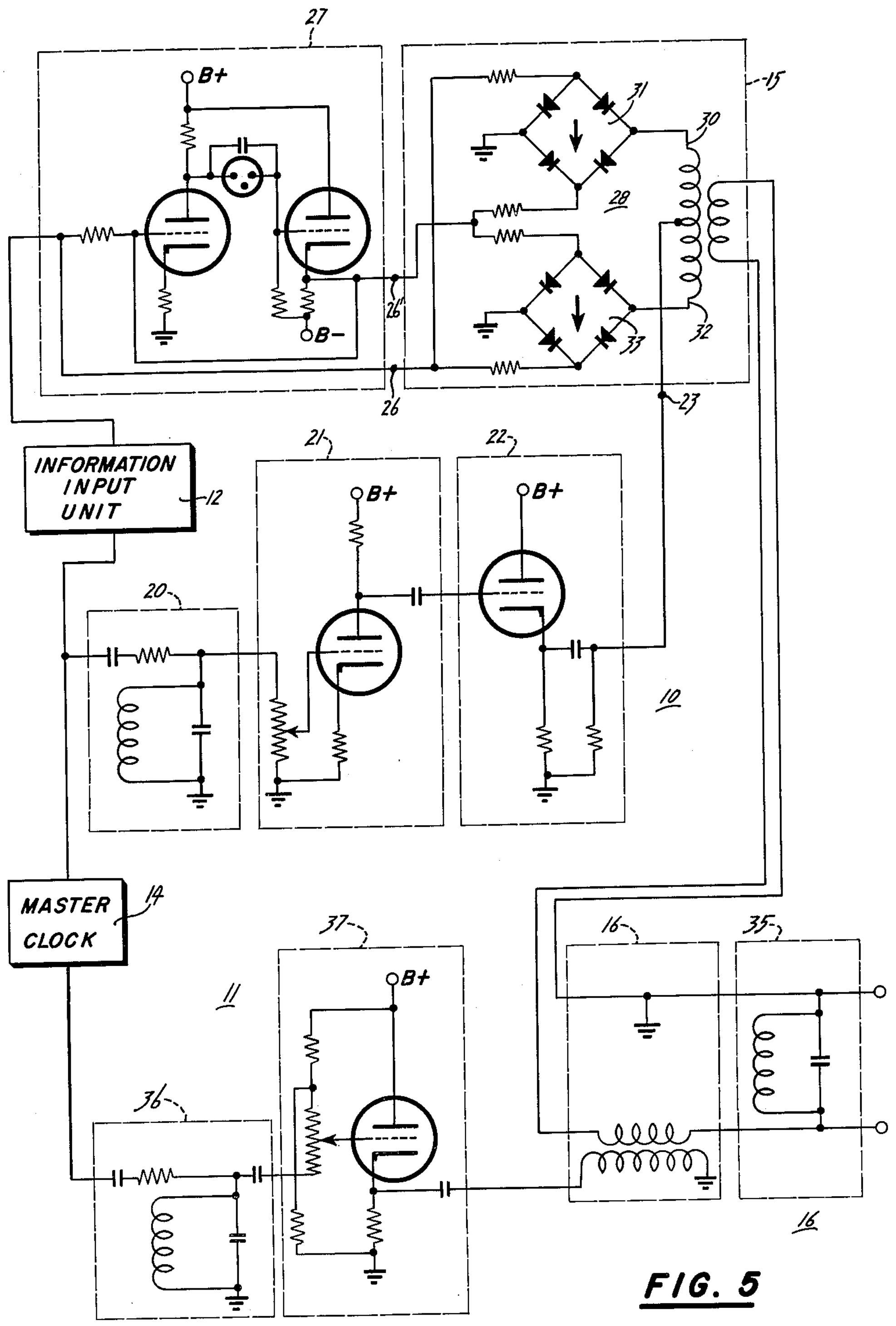
Fig. 5 is a schematic view of the transmitter shown in Fig. 1.
Figure 6:
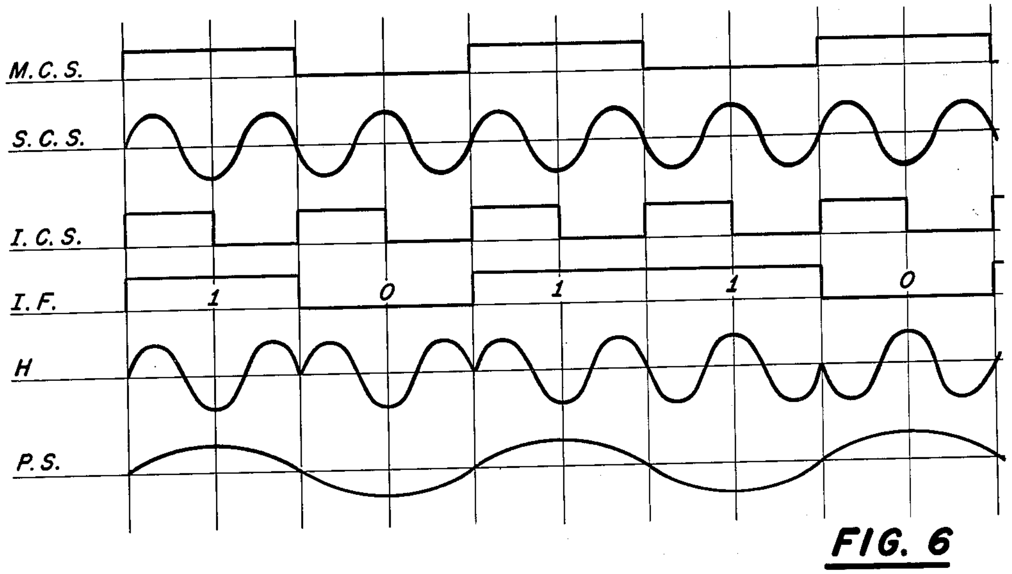
Fig. 6 is a graph illustrating the various signals generated by the transmitter shown in Figs. 1 and 5.

The details of the transmitter unit are shown in Fig. 5 and the various signals generated thereby are shown in Fig. 6. The master clock unit 14 controls the operation of the various signal generating means 10, 11 and 12, and hence the output signals of these generators are in synchronism. Since any suitable device may be employed as the master clock, it is represented in block form in both Figs. 1 and 5, the master clock signal being represented by signal MCS in Fig. 6 and for purposes of explanation may be assumed to have a frequency of 800 pulses/sec.

The means 10 for generating the subcarrier signal as shown in Fig. 5 comprises a filter 20, an amplifier 21 whose output is connected to input terminal 23 of modulating means 15 through a cathode follower 22. Subcarrier generating means 10 provides a subcarrier signal having a frequency of 2400 c.p.s. by filtering out the third harmonic component of the master clock signal MCS. The subcarrier signal supplied to the terminal 23 of the modulator means is represented by signal SCS in Fig. 6.

The means 12 for generating the information signal may be any suitable device which provides an informational signal similar to signal IF shown in Fig. 6 at a predetermined bit rate, e.g. 1600 bits/sec. The information signal generating means 12 includes a suitable information clock pulse generator for clocking information at the predetermined rate, e.g., 1600 bits/sec. The information clocking signal ICS shown in Fig. 6 may be generated in any suitable manner such as by generating the second harmonic component of the master clock signal MCS. The information signal IF is supplied to terminal 26 of modulating means 15 through the driver circuit 27 which may be considered part of the information input unit. Driver circuit 27 also supplies an inverted information signal (not shown) to terminal 26'.

The modulating means 15 comprises a suitable balanced modulator 28 which generates the bit synchronous phase modulated subcarrier signal designated H in Fig. 6. The informational signal IF causes terminal 30 of the modulator to be connected to ground through diode unit 31 if the information is a "1" and terminal 32 to be connected to ground through diode unit 33 if the information is a "0." Information is therefore contained in the phase modulated subcarrier in the form of 180° phase reversals relative to the original subcarrier, one bit time corresponding, in this instance, to 1½ cycles of the subcarrier. In other words, if a "1" is being transmitted, the phase modulated subcarrier H is in phase with the subcarrier signal SCS and if a "0" is being transmitted, the phase modulated subcarrier H is 180° out of phase with the subcarrier signal SCS. Signal H is supplied to the input terminal of a communication channel through the signal summing unit 16 and bandpass filter 35.

The means 11 for generating the pilot signal PS, as shown, comprises the pilot signal filter 36 which is connected to the signal summing unit 16 through a suitable cathode follower unit 37. The pilot filter functions to filter out the first harmonic component of the master clock signal MCS and therefore provides an 800 c.p.s. pilot signal, designated PS in Fig. 6, which is transmitted simultaneously and in synchronism with the phase modulated subcarrier H but at a substantially lower signal level.

The frequency of the pilot signal PS is chosen to coincide with the minimum energy band of the phase modulated signal spectrum, shown in Fig. 3, and hence does not interfere with the phase modulated subcarrier signal H. The frequency of the pilot signal PS therefore depends on the frequency of the subcarrier signal SCS and the bit rate frequency, since these in turn determine the signal spectrum shown in Fig. 3 and the location of the minimum energy band. The minimum energy band is centered about the difference frequency between the subcarrier signal and the bit rate frequency which, in the present example, is 800 c.p.s.

The phase modulated subcarrier H and the pilot signal PS are supplied to a single sideband suppressed carrier communication channel which, as mentioned previously, causes a signal spectrum shift illustrated in Fig. 4 by rotating vectors H and H'. With reference to Fig. 4, the phase modulated subcarrier signal H is represented by vector H while the shifted phase modulated subcarrier is represented by the vector designated H', the angular rate $\alpha$ between the two vectors corresponding to the amount of frequency spectrum shift. Pilot signal PS is also shifted by $\alpha$ c.p.s. and in Fig. 4 the vector designated PS' corresponds to the shifted pilot signal. The signals H' and PS' correspond to the signals supplied to the input terminals of the receiver shown in Fig. 2.

While the transmitter described and shown in Fig. 1 operates on a bit synchronous principle, i.e., the bit rate frequency being a multiple of the subcarrier, it should be understood that a nonsynchronous bit rate frequency may be employed if desired. Such a transmitter is shown in Fig. 10 and is described later in the specification.

With reference to Fig. 2, the data receiver shown diagrammatically in block form comprises generally means 40 for regenerating a shifted subcarrier signal SCS', means 41 for generating a receiver clock signal RCS, and means 43 for demodulating or detecting the shifted phase modulated subcarrier H' with the reconstructed shifted subcarrier SCS' to provide an output informational signal OIS to the information output device 44 under the control of the receiver clock signal RCS.

The details of the data receiver may be seen by reference to Figs. 7*a* and 7*b* which together illustrate schematically the data receiver shown diagrammatically in Fig. 2.

Referring to Figs. 7*a* and 7*b*, the means 40 for reconstructing the shifted subcarrier comprises a one-bit delay unit 50, a balanced modulator 51, a shifted subcarrier filter 52, an amplifier 53 and a squaring circuit 54. The shifted phase modulated subcarrier signal H' shown in Fig. 8 is delayed one bit time by the one-bit delay unit 50 and is shown by signal DH' in Fig. 8. Delay unit 50 may be any standard well known delay component which functions to delay the incoming signal for a predetermined bit time. Signal DH' is applied to terminal 56 of the balanced modulator. Assuming for the moment that an output informational signal OIS corresponding to the information contained in the shifted phase modulated subcarrier H' and in synchronism therewith is available for application to terminals 57 and 58 of modulator 51 in a push-pull arrangement, the balanced modulator 51 functions in a manner similar to the balanced modulator of the transmitter in that a "1" bit of the signal OIS causes modulator 51 to generate a corresponding in-phase output signal while a "0" bit of the informational signal OIS causes the modulator to generate an 180° out-of-phase output signal. It will be seen, therefore, that the modulator reconstructs the subcarrier by reversing bit portions (1½ cycles) of the delayed, shifted phase modulated subcarrier DH' at times determined by the informational signal OIS to provide the shifted subcarrier signal SCS' shown in Fig. 8. The output of the modulator 51 is connected to the signal detecting means 43 and receiver clock pulse generator 41 through the filter 52, amplifier 53 and squaring circuit 54. The output of the squaring circuit includes the cathode followers 63 and 64 which provide the squared shifted subcarrier signal designated $(SCS')^2$ in Fig. 8.

The receiver clock pulse generator 41 which generates the receiver clock signal RCS comprises a filter 70, an amplifying section 71, a balanced modulator 72, a filter 73, a phase adjusting amplifier section 74 and a shaping circuit 75. The pilot signal PS′ (not shown) is filtered from the incoming signal to the receiver unit by filter 70, amplified by section 71 and supplied to the input terminal 76 of the balanced modulator 72. The other input to modulator 72 is the squared, shifted subcarrier signal $(SCS')^2$ obtained from the shifted subcarrier generator 40. While the frequency of the pilot signal PS′ has been shifted by the communication channel by $\alpha$ c.p.s., the relative frequency difference between the shifted pilot signal PS′ and the reconstructed subcarrier SCS′ remains constant since the subcarrier's signal is also shifted in effect by $\alpha$ c.p.s.

The generation of the receiver clock signal by modulator 72 does not lend itself to a graphical representation and hence has not been illustrated in Fig. 8. However, it can be shown mathematically that the output signal of the modulator 72 has a frequency corresponding to the bit rate of the system since the difference frequency between the 800 c.p.s. pilot signal PS of the transmitter and the 2400 c.p.s. subcarrier signal SCS of the transmitter is 1600 c.p.s.

The output of the balanced modulator 72 is filtered by filter 73, amplified and adjusted in phase to provide an input signal to the shaping circuit 75. The input signal to the shaping circuit is shown in Fig. 8 by the RCS signal.

Shaping circuit 75, shown in Fig. 7*b*, comprises a signal squaring unit 80, a control unit 81 for a blocking oscillator 82, and an adjustable delay unit 83. The RCS signal from the phase adjusting amplifier 74 is squared by unit 80 to provide signal $(RCS)^2$ shown in Fig. 8 and applied to control unit 81 which provides triggering pulses for the blocking oscillator 82. A pulse transformer 86 having its primary in the plate circuit of the blocking oscillator 82 provides a pair of squelch pulses to the squelch circuit of the signal detecting means 43 for purposes which will be explained later on in the specification. The output of the blocking oscillator 82 is also supplied to output gates in the information output device 44 through an adjustable delay unit 83. The squelch pulse signal SPS and the gating pulse signals GPS are shown in Fig. 9 in connection with the signals occurring in the signal detecting means 43.

The signal detecting means 43 comprises a filter 89, an amplifying section 90, a balanced demodulator 91, an integrator 92, a squelch unit 93 and a pulse amplifying unit 94. The shifted phase modulated subcarrier H′ is amplified by amplifying section 90 whose output signal is supplied to the balanced demodulator 91 and also to the subcarrier regenerator 40. The other input to demodulator 91 is the squared, reconstructed subcarrier signal $(SCS')^2$ obtained from the subcarrier generating means 40. The shifted phase modulated subcarrier H′ and the squared subcarrier signal are repeated in Fig. 9 together with the demodulated signal obtained from the output of demodulator 91. This latter signal is designated as DMS in Fig. 9. It will be seen that the action of the demodulator provides a signal, all of which has a positive polarity, if the phase modulated subcarrier signal H′ contains a "1" bit and a signal, all of which is negative, if the signal H′ contains a "0" bit.

The DMS signal is supplied to the integrating unit 92 comprising condenser **92*c* and resistor 92*r* to provide signal IS shown in Fig. 9. Condenser 92*c* is charged in proportion to the area of the incoming signal DMS and discharged at the end of each bit time by the squelch unit 93 which receives a squelch pulse signal designated SPS in Fig. 9 from the pulse transformer 86 in the plate circuit of blocking oscillator 82 of the receiver clock pulse generating means 41. The squelch pulse signal SPS as shown in Fig. 9 occurs at the end of each bit time, its phase relation relative to the information signal IS being suitably adjusted by the phase adjusting amplifier section 74. The squelch pulse signal SPS causes condenser 92*c* to be connected to ground through the squelch unit 93**. The pulse signal obtained by squelching the integrated signal is designated IPS in Fig. 9 and corresponds in polarity to the transmitted data.

Signal IPS is supplied to a suitable pulse amplifier 94 which supplies a push-pull signal to the grids of flip-flop 99 in the information output device 44 through a pair of coincidence gates 100 and 101 which are controlled by the slightly delayed gating pulse GP obtained from the delay unit 83 in the shaping circuit 75 of the receiver clock pulse generator 41. The information output signal designated IOS in Fig. 9 appears at the terminals 106 and 107 of the information output device 44 and is identical to the signal supplied by the information generating means 12 of the transmitter.

Fig. 10 illustrates a means for transmitting a phase modulated subcarrier signal which is not bit synchronous. The transmitter shown in Fig. 10 is similar to that shown in Fig. 1 except that the generation of the subcarrier signal is not under the control of the clock signal which generates the information and pilot signals. As shown in Fig. 10, the transmitter comprises an information output device 112, such as an electronic computer, which generates an information input signal under control of its own clock signal at a frequency suitable for computer operation, a subcarrier generator 110, e.g., an oscillator, which generates a subcarrier signal at another predetermined frequency, a pilot signal generator 111 for generating a pilot signal which is synchronous with the information input signal, and a balanced modulator 115 for phase modulating the subcarrier signal in accordance with the informational signal from information output device 112.

Pilot signal generator 111, as shown, comprises a balanced modulator 111M, a filter 111F and a cathode follower unit 111C. The pilot signal is generated by modulating the subcarrier signal with the information clock signal of the computer in modulator 111M, filtering out the unwanted upper sidebands in filter 111F and applying the pilot signal to the signal summing network 116 from the cathode follower unit 111C.

The frequency of the subcarrier signal may vary by an angular rate $\beta$ relative to the frequency of the information signal, since each signal is generated independently of the other. However, this frequency difference has no effect on the operation of the receiver shown in Figs. 2 and 7*a* and 7*b* since the frequency of the pilot signal is also varied by the angular rate $\beta$. The response of the receiver to the $\beta$ rate shift is the same, therefore, as the response to the $\alpha$ rate shift caused by the communication channel, and hence the receiver operates in the manner previously described.

It will be seen that in accordance with the present invention data may be transmitted by single sideband suppressed carrier modulation through a communication channel which shifts the signal spectrum by transmitting a subcarrier, phase modulated by an informational signal corresponding to the data to be sent, simultaneously with a pilot signal, and at the receiver reconstructing a shifted subcarrier signal, modulating the shifted phase modulated subcarrier with the reconstructed subcarrier to provide an informational signal, and modulating the shifted pilot signal with the reconstructed subcarrier to provide clock signals for clocking the informational signal to an information output device.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for transmitting binary data from a data transmitter to a data receiver through a communication channel to provide an output signal from said receiver corresponding to the data transmitted, said system comprising in combination means for simultaneously transmitting a subcarrier signal phase modulated in accordance with a binary signal corresponding to the data to be transmitted and a pilot signal, means for regenerating a reference signal from said transmitted phase modulated subcarrier signal and the output signal of said receiver, means for generating a clock signal from said transmitted pilot signal and said reference signal, and means under the control of said clock signal and said reference signal for generating said output signal from said transmitted phase modulated subcarrier signal.

2. A system for transmitting data from a data transmitter to a data receiver through a communication channel to provide an output signal from said receiver corresponding to the data transmitted, said system comprising in combination means for simultaneously transmitting a bit synchronous subcarrier signal phase modulated in accordance with a binary signal corresponding to the data to be transmitted and a synchronous pilot signal, means for regenerating a reference signal from said transmitted phase modulated subcarrier signal and the output signal of said receiver, means for generating a clock signal from said transmitted pilot signal and said reference signal, and means under the control of said clock signal and said reference signal for generating said output signal from said transmitted phase modulated subcarrier signal.

3. A system for transmitting binary coded data from a data transmitter to a data receiver through a single sideband suppressed carrier communication channel comprising means for simultaneously transmitting a bit synchronous subcarrier signal phase modulated by a binary signal corresponding to said data and a synchronous pilot signal, means for receiving said transmitted signal to provide an output signal corresponding to the transmitted data, said receiver means comprising means for generating a subcarrier signal from said phase modulated subcarrier signal and said output signal, means for generating a clock signal from said subcarrier signal and said transmitted pilot signal, and means for generating said output signal from said phase modulated subcarrier signal and said subcarrier signal under the control of said clock signal.

4. In a binary data transmission system means for detecting a phase modulated subcarrier signal transmitted through a single sideband suppressed carrier communication channel to provide an output informational signal corresponding to binary data contained in the input information signal which modulates the subcarrier, said means comprising means for transmitting a pilot signal through said channel to said detecting means synchronously with said input informational signal, means responsive to said transmitted phase modulated subcarrier signal and said output informational signal for generating a reference signal, means responsive to said reference signal and said transmitted pilot signal for generating a clock signal, and means under control of said clock signal for generating said output informational signal in response to said phase modulated subcarrier signal and said reference signal.

5. In a binary data transmission system means for detecting a bit synchronous phase modulated subcarrier signal transmitted through a single sideband suppressed carrier communication channel to provide an output informational signal corresponding to binary data contained in said transmitted signal, said means comprising means for transmitting pilot signal through said channel to said detecting means synchronously with said bit synchronous phase modulated subcarrier signal, means responsive to said transmitted phase modulated subcarrier signal and said output informational signal for generating a reference signal, means responsive to said reference signal and said transmitted pilot signal for generating a clock signal, and means under control of said clock signal for generating said output informational signal in response to said phase modulated subcarrier signal and said reference signal.

6. In a system for transmitting data between remote points through a single sideband suppressed carrier communication channel, data receiving means operable to detect a bit synchronous phase modulated subcarrier signal to provide an informational signal corresponding to transmitted data, said means comprising means for generating a pilot signal in synchronism with said subcarrier signal at a predetermined frequency, means for delaying said phase modulated subcarrier signal, means responsive to said delayed subcarrier signal and said informational signal for generating a reference subcarrier signal, means responsive to said reference subcarrier signal and said pilot signal for generating a clock signal, and means responsive to said bit synchronous phase modulated subcarrier signal and said reference subcarrier signal for generating said informational signal under the control of said clock signal.

7. The invention recited in claim 6 wherein the predetermined frequency of the pilot signal corresponds substantially to the center frequency of the minimum energy band in the signal spectrum of the bit synchronous phase modulated subcarrier signal.

8. The invention recited in claim 7 wherein the frequency spectrum of the received phase modulated subcarrier signal is shifted relative to the frequency spectrum of the transmitted phase modulated subcarrier signal.

9. A system for transmitting data in the form of code pulse signals between a transmitter and a receiver through a single sideband suppressed carrier telephone network, comprising means for generating a subcarrier signal, means for generating an informational signal, means for generating a pilot signal, means for controlling the generation of said signals to cause said signals to be synchronized, means for phase modulating said subcarrier signal with said informational signal, means for transmitting only said phase modulated subcarrier signal and said pilot signal to said receiver through said network, means for regenerating a reference subcarrier signal from said phase modulated subcarrier signal comprising a first modulator responsive to said phase modulated subcarrier signal and an output signal corresponding to the data contained by said phase modulated subcarrier signal, means for generating a clock signal comprising a second modulator responsive to said reference subcarrier signal and said pilot signal, and means for generating said output signal comprising detector means responsive to said phase modulated subcarrier signal and said reference subcarrier signal for providing a demodulated signal and means responsive to said clock signal for clocking said demodulated signal to provide said output signal.

References Cited in the file of this patent

UNITED STATES PATENTS

| | | |
|---|---|---|
| 1,559,642 | Nyquist | Nov. 3, 1925 |
| 2,402,973 | Moore | July 2, 1946 |
| 2,542,627 | Chevallier | Feb. 20, 1951 |
| 2,562,682 | Schmitt | July 21, 1951 |
| 2,652,556 | Borsum et al. | Sept. 15, 1953 |